(12) United States Patent
Beckwith et al.

(10) Patent No.: US 8,373,703 B2
(45) Date of Patent: Feb. 12, 2013

(54) SYSTEM AND METHOD FOR INCORPORATING A PERSONALIZED WRITING STYLE INTO A WORD PROGRAM

(76) Inventors: Penny Beckwith, Swartz Creek, MI (US); Eric R. Lane, Sr., Romulus, MI (US)

( * ) Notice: Subject to any disclaimer, the term of this patent is extended or adjusted under 35 U.S.C. 154(b) by 725 days.

(21) Appl. No.: 12/565,564

(22) Filed: Sep. 23, 2009

(65) Prior Publication Data

US 2010/0073297 A1 Mar. 25, 2010

Related U.S. Application Data

(60) Provisional application No. 61/099,819, filed on Sep. 24, 2008.

(51) Int. Cl.
*G06T 11/00* (2006.01)
(52) U.S. Cl. ........... 345/467; 345/173; 345/26; 345/179
(58) Field of Classification Search .................. None
See application file for complete search history.

(56) References Cited

U.S. PATENT DOCUMENTS

| | | | |
|---|---|---|---|
| 4,649,231 A | 3/1987 | Marbet | |
| 4,817,034 A | 3/1989 | Hardin, Sr. et al. | |
| 5,108,206 A | 4/1992 | Yoshida | |
| 5,295,238 A | 3/1994 | Dickson | |
| 5,327,342 A | 7/1994 | Roy | |
| 5,365,598 A | 11/1994 | Sklarew | |
| 5,412,771 A | 5/1995 | Fenwick | |
| 5,502,461 A * | 3/1996 | Okamoto et al. | ............. 345/173 |
| 5,548,092 A | 8/1996 | Shriver | |
| 5,640,589 A | 6/1997 | Takayama et al. | |
| 6,154,758 A | 11/2000 | Chiang | |
| 6,181,329 B1 | 1/2001 | Stork et al. | |
| 6,493,464 B1 | 12/2002 | Hawkins et al. | |
| 6,697,524 B1 * | 2/2004 | Arai et al. | ...................... 382/187 |
| 6,754,875 B1 | 6/2004 | Paradies | |
| 6,958,755 B1 * | 10/2005 | Dickens | ........................ 345/467 |
| 7,032,175 B2 | 4/2006 | Wu | |
| 7,188,313 B2 | 3/2007 | Hughes, Jr. et al. | |
| 7,281,245 B2 | 10/2007 | Reynar et al. | |
| 7,310,416 B1 | 12/2007 | Henderson | |
| 7,325,194 B2 | 1/2008 | Moore et al. | |
| 7,342,575 B1 | 3/2008 | Hartwell et al. | |
| 7,356,537 B2 | 4/2008 | Reynar et al. | |
| 7,380,203 B2 | 5/2008 | Keely et al. | |

(Continued)

FOREIGN PATENT DOCUMENTS

| | | |
|---|---|---|
| JP | 2002279351 | 9/2002 |
| KR | 2006084 | 1/2002 |

(Continued)

OTHER PUBLICATIONS

YourFonts.com, online font generator (dated at least as early as Oct. 3, 2008—date of first user quote).

*Primary Examiner* — Lixi C Simpson
(74) *Attorney, Agent, or Firm* — Gifford, Krass, Sprinkle, Anderson & Citkowski, P.C.

(57) ABSTRACT

A system, method and computer writeable medium for creating a personalized font and which includes an electronic pad exhibiting a display. A stylus pen is manipulated to mark upon at least one field exhibited by the pad on its display. A separate processor operable device incorporates a keyboard, and to which the electronic pad is communicated. In this fashion, the pad is utilized in combination with the keyboard in order to create a personalized font associated with a software writing program of the processor operable device.

8 Claims, 1 Drawing Sheet

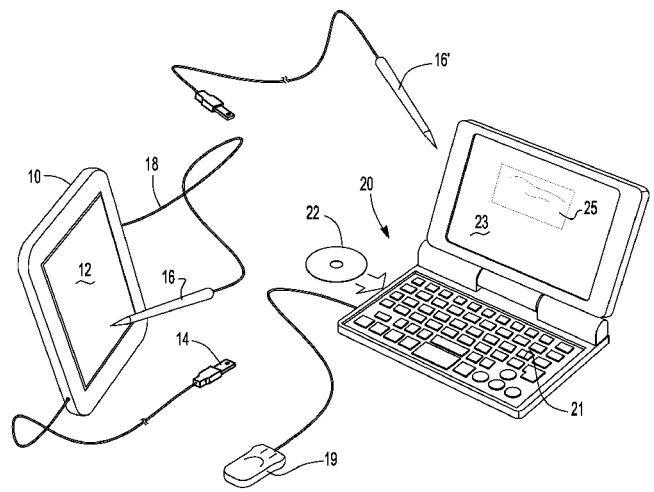

U.S. PATENT DOCUMENTS 7,483,570 B1 * 1/2009 Knight .......................... 382/186
7,697,001 B2 * 4/2010 Lin ............................... 345/467
8,103,100 B2 * 1/2012 Jang .............................. 382/187
2006/0007164 A1   1/2006 Liu et al.
2007/0097124 A1 * 5/2007 Chang et al. .................. 345/467

FOREIGN PATENT DOCUMENTS

WO    WO-03060684 A1    7/2003

* cited by examiner

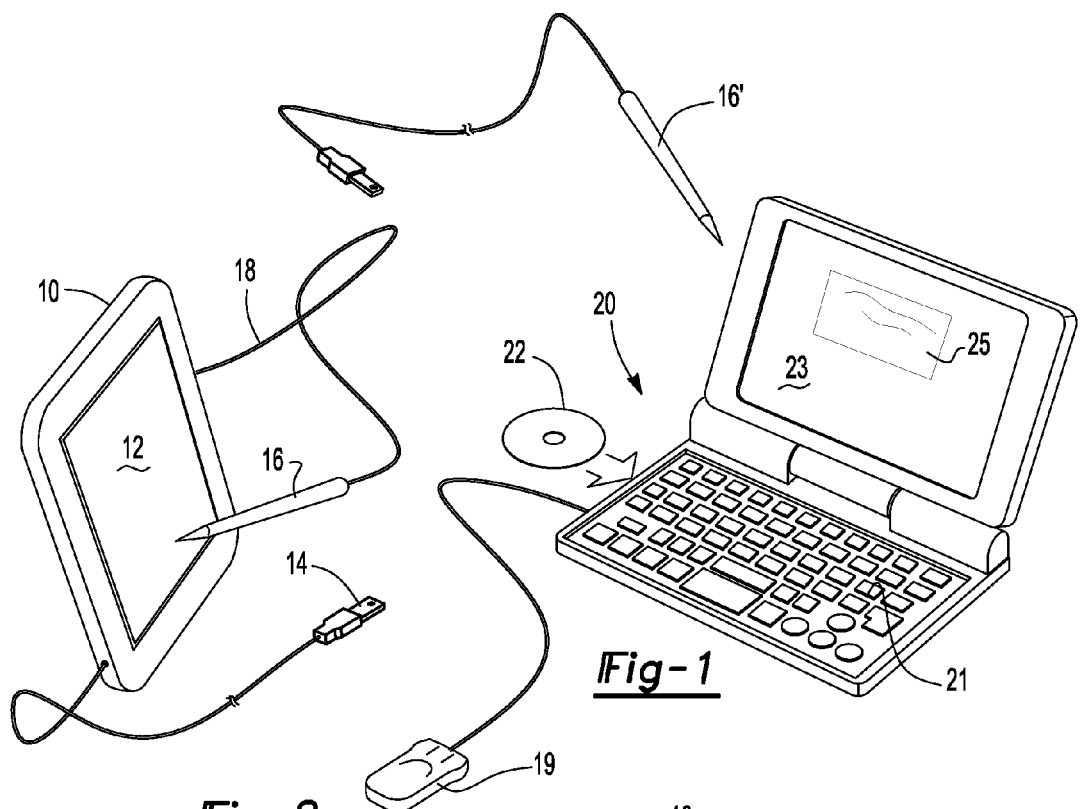

Fig-1

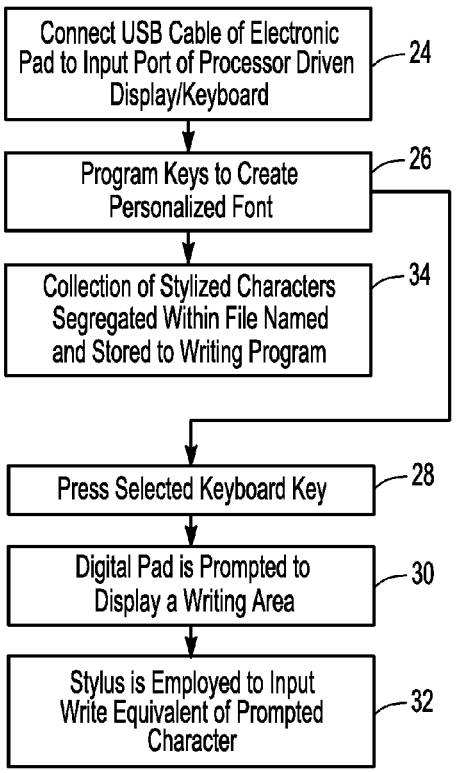

Fig-2

- Connect USB Cable of Electronic Pad to Input Port of Processor Driven Display/Keyboard — 24
- Program Keys to Create Personalized Font — 26
- Collection of Stylized Characters Segregated Within File Named and Stored to Writing Program — 34
- Press Selected Keyboard Key — 28
- Digital Pad is Prompted to Display a Writing Area — 30
- Stylus is Employed to Input Write Equivalent of Prompted Character — 32

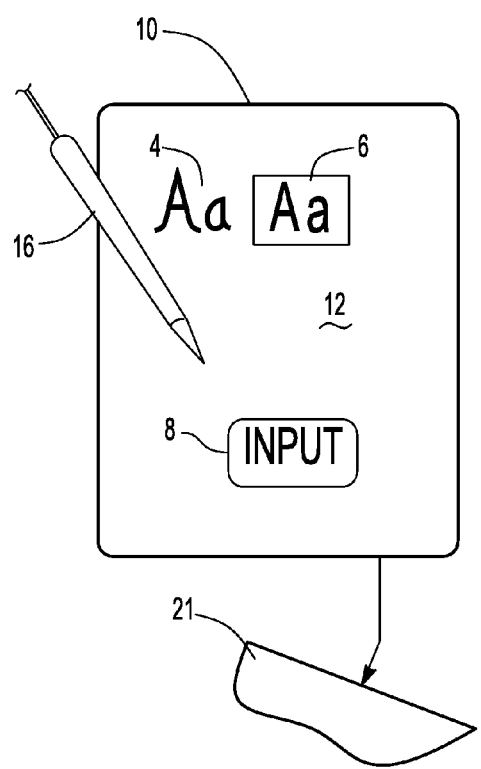

Fig-3

SYSTEM AND METHOD FOR INCORPORATING A PERSONALIZED WRITING STYLE INTO A WORD PROGRAM

CROSS REFERENCE TO RELATED APPLICATIONS

The present application claims the priority of U.S. Provisional Patent Application Ser. No. 61/099,819, filed Sep. 24, 2008.

FIELD OF THE INVENTION

The present invention generally relates to a system, method and computer writeable media for creating a personalized font for incorporation into such as a traditional writing program (such as Word or the like). More specifically, the present invention discloses an electronic pad with an input (such as digital) stylus. An associated software module interfaces with a processor driven program and, in combination with such as a monitor and standard keyboard, allows the user to custom create a font in sequential fashion (e.g. letters cap and small, punctuation, and the like). This is typically accomplished by programming, successively, the characters on each of the keyboard keys. Additional contemplated variations of your system include their incorporation into other electronic devices, such as cell phones, PDA's, and other text generating devices.

DESCRIPTION OF THE PRIOR ART

The prior art documented with examples of writing font recognition and translation methods and assemblies. Among these, Hughes U.S. Pat. No. 7,188,313 teaches a program, method and apparatus for context sensitive (handwritten) font generation. A computer program product contains instructions to identify a character string including upper case, lower case, and/or symbolic characters. Additional features include identifying a first character of the string, identifying a plurality of handwritten glyphs corresponding to the character, selecting one of the glyphs based upon an adjacent character in the string, and repeat the foregoing steps, thereby converting the character string in order to create a standard (non-personalized) font.

Fenwick U.S. Pat. No. 5,412,771 discloses a computer implemented method for producing a font for creating strings of glyphs representing characters in a language having a handwritten, or other, appearance. A first step of the method contemplates categorizing each glyph within a set of glyphs to be utilized to create the font according to a set of predetermined ligature types, however does not utilize any key programming features. Following categorization, values associated with ligatures of the glyphs are averaged to produce representative ligature values for each of the ligature type categories and modified, where necessary, to produce strings of glyphs exhibiting a handwritten appearance. Fenwick also discloses a number of different ways in which handwritten glyphs are programmed into the computer, including such as digitally scanning writing from a paper or entering the writing sample directly from a writing tablet or stylus-sensitive display in either bitmap or cubic spline format.

Roy U.S. Pat. No. 5,327,342 teaches a method and apparatus for generating personalized handwriting and more particularly, an apparatus and method for producing handwriting that simulates the user's own handwriting. Chiang U.S. Pat. No. 6,154,758 discloses a method for converting displayed text from one format to another. Text is inputted as handwriting in a pen-based computer and is then automatically converted to a typeface text of a first text domain. A conversion gesture is employed for converting the displayed text from the first text domain to a second character (such as in an Oriental language as illustrated).

Additional references include the Liu U.S. Publication No. 2006/007164 which teaches peripheral equipment for a computer, including namely a wireless and passive table for inputting to the computer, and which converts the track of handwriting to digital X, Y coordinates. Other computer based character recognition programs include such as those set forth in Hardin U.S. Pat. No. 4,817,034, Hawkins U.S. Pat. No. 6,493,464 and Dickson U.S. Pat. No. 5,295,238.

SUMMARY OF THE PRESENT INVENTION

The present invention discloses a system for creating a personalized font and which includes an electronic pad exhibiting a display. A stylus pen is manipulated to mark upon at least one field exhibited by the pad on its display. A separate processor operable device incorporates a keyboard, and to which the electronic pad is communicated. In this fashion, the pad is utilized in combination with the keyboard in order to create a personalized font associated with a software writing program of the processor operable device.

The processor operable device can further include any of a laptop computer, desktop computer, cellular telephone, or a personal digital assistant. The electronic pad may also include a digital input device incorporating a software component which is interfaceable with a separate processor operable device.

A related method for creating a stylized font includes the steps of communicating an electronic pad to an input location of a separate processor operable device including a keyboard and initiating a protocol between the pad and processor operable device in order to progressively program a stylized font, the protocol including selecting individual characters, via the keyboard, for display upon a field of the electronic pad. A stylus is employed to input, by marking, into a separate field of the electronic pad, a personalized duplication/representation of the selected characters and a completed collection of stylized representations are compiled into a file for incorporation into a writing program associated with the processor operable device. Additional features include successively entering, into the designated fields, each figure or character represented on the keyboard.

A computer writeable medium is also disclosed for creating a personalized digital font for incorporation into a software based writing program, and which includes a first protocol for communicating the writing program, contained within a processor operable device, with a separately communicable electronic input device exhibiting a display face. A second protocol, responsive to a character selection from a keyboard associated with the processor operable device, displays the selected character on a field associated with the display face of the electronic input device. A third protocol displays a corresponding field upon the display face of the electronic input device, within which is subsequently engaged a marking stylus to create a personalized representation of the selected character. Finally, a fourth protocol compiles a completed collection of stylized representations into a file for incorporation into a writing program associated with the processor operable device.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is an illustration of an electronic pad with digital stylus pen, these communicating with a processor driven display having a conventional keyboard input;

FIG. 2 is a schematic illustration of a protocol associated with the creation of a stylized font according to the present invention; and FIG. 3 is an illustration similar to that shown in FIG. 1 and better showing the protocol by which the stylized font vocabulary is entered according to the present invention.

DETAILED DESCRIPTION OF THE PREFERRED EMBODIMENTS

Referring now to FIGS. 1-3, the present invention discloses an electronic pad with an input (such as digital) stylus for use with a conventional processor driven computer and keyboard, and in order to create a customized font associated with a writing program, such as in one non-limiting example being Microsoft Word®, as well as either Microsoft or Apple e-mail writing programs. As previously described, an associated software module interfaces with a processor driven program and, in combination with an interface-ability established between the electronic and digitally inputting pad/stylus, such as with a monitor and standard keyboard, allows the user to custom create a font in sequential fashion (e.g. letters cap and small, punctuation, and the like). This is typically accomplished by programming, successively, the characters on each of the keyboard keys. Additional contemplated variations of your system include their incorporation into other electronic devices, such as cell phones, PDA's, and other text generating devices.

FIG. 1 is an illustration of a first version of a secondary input device, this in the form of an electronic pad 10 including a three dimensionally and generally planar shaped body exhibiting a screen 12 and which is provided as a first hardware component of the invention. A cable, such as terminating in a USB input connection, is shown at 14 and which extends from the pad 10. The cable 14 can also be substituted by a suitable wireless connection for accessing an associated processor driven component (with reference to 20). The electronic pad 10 is further either self-powered (such as by a battery), powered by a separate AC/DC outlet, which can draw suitable power via its USB input connection, from the separate processor driven component 20.

The pad 10 can be provided according to any of a number of different configurations however, and according to one known application, can be a personal digital assistant (PDA), digital reader device or the like exhibiting known properties and features. The pad 10 can be further modified through the incorporation of a suitable software module (to be subsequently described) in order to perform according to protocols which are among the objects of the invention.

A digital stylus 16 is provided and is constructed according to technology known in the relevant art in order to input a digitally read and transmitted character, as will be further described in additional detail. The stylus 16 can be connected by a communication wire 18 or, as is also envisioned, can be reconfigured to connect in wireless fashion to the electronic pad 10. Further variants contemplate that the stylus 16 can be provided as a non-communicating marking implement, and with the screen surface 12 of the PDA/pad 10 being configured to input read/digitize markings made thereupon by the stylus 16 (further reference to which being had with the description of FIG. 3).

The pad 10 (with or without the digital stylus pen), communicates with a main processor driven display having a conventional keyboard input. This is again generally shown in FIG. 1 at 20, and which is illustrated in the selected variant as a conventional computer laptop exhibiting all of the features of processor driven display and keyboard input. It is also envisioned that other suitable processor driven display devices can also be substituted, these including other conventional desktop style computers, as well as more miniaturized and processor driven key communication devices, including cellular telephones (e.g. Blackberry® phones), other types of PDA's and other texting devices.

Of note, the processor driven device 20 requires suitable processor capabilities for downloading/storing/retrieving/displaying a software component, see as generally represented by CD 22. It is also understood that the software component 20 can be provided as a suitable downloadable file (such as through the Internet) or provided in some other fashion. The electronic pad 10 further incorporates a digital input device (or capabilities) including a software component which is interfaceable with the separate processor operable device 20.

Additional variants contemplate substituting the pad 10 entirely in favor of the provision of a computer mouse (at 19 in FIG. 1 along with keyboard portion 21 in relation to computer/PC 20). In this fashion, the mouse 19 can be employed to input any variation of characters, including letters, punctuation marks, numbers and other symbols representative of a keyboard through an entry box (screen) which would appear on the user's monitor (see also screen portion 23 associated with PC 20).

Additional envisioned variants include the ability to employ a specially configured stylus and without the provision of a pad 10. In such a variant, the stylus (see as representatively shown at 16') would plug directly into a USB port associated with the computer 20 and rather than connected to the pad 10 as shown. Such a modified stylus would be configured with the necessary processor capabilities built into micro circuitry associated with the pen 16' (this in substitution of such technology associated with the pad 10), and so as to be capable of writing on any flat surface and establishing the desired input directly into the computer processor 20.

Other configurations include the provision of a touch screen which would then employ a software configured entry box, see at 25, on the screen 23 for programming purpose. Such a variation is contemplated to eliminate the need for a stylus altogether, and which may also be applicable to cell phones, PDA's and other handheld processing devices. Such an associated software program would be written so that the entry box would appear on the screen 23 and, through the modified stylus or other similar device, be designed such that the user could further enter their style of writing directly on the screen 23, thereby eliminating need for use of the entry pad 10.

FIG. 2 is a schematic illustration of a protocol associated with the creation of a stylized font according to the present invention. In a first step 24, the USB cable 14 (or other suitable wireless communication) of the electronic pad 10 is inputted to a location of the processor driven display (e.g. computer with keyboard, pda, texting device, etc.).

At step 26, a unique protocol is initiated in order to progressively program the stylized font and which includes, according to a subroutine initiating at step 28, selecting and depressing an initial key of the keyboard (again at 20). At step 30, the digital pad 10 (see FIG. 3) is prompted to display a field including a first area 4 in which a character representation is shown, such field corresponding to the character selected from the keyboard.

At step 32, the stylus 16 is employed/manipulated to input (such as by writing) into a separate box (or field) 6, a personalized duplication/representation of the selected character(s). The protocol contemplates the user successively entering, into the designated fields, each figure or character represented on the keyboard, the purpose for which being to create a personalized and stylized font for subsequent incorporation into the suitable writing program.

Finally, and at step 34, the completed collection of stylized characters is segregated (e.g. assigned) to a file and which, upon being titled, is stored as a possible font selection within the commercial writing program. An example of this is the saving and assigning of the collection of handwritten characters with user's name as the title of the file, and which can be stored as a separate font in a field associated with the given writing program (such as for example including other known font types Ariel, Times New Roman, etc.).

Upon selecting the personalized created font, the user would then be able to type (or text) within the writing program, the personalized font mimicking the personalized handwriting style of the individual. It is also again envisioned that the user could customize symbols and other markings associated with the keyboard keys (and again in addition to the capital and small letters and number characters associated with the conventional alpha-numeric components).

It is further envisioned that a one-touch system can be incorporated and by which the use of a single key would form a desired word. Applications of the present system, method and computer writeable medium can also include Internet dating and other sites (such as which utilize chat rooms), blogs, personal journals, and other similar venues which generally cater to those who would like to make themselves known more personally.

A related method for creating a stylized font includes the steps of communicating an electronic pad 10 to an input location of a separate processor operable device 20 including a keyboard and initiating a protocol between the pad 10 and processor operable device 20 in order to progressively program a stylized font. The protocol includes selecting individual characters, via the keyboard, for display upon a field of the electronic pad 12. A stylus 16 is employed to input, by marking, into a separate field of the electronic pad 10, a personalized duplication/representation of the selected characters and a completed collection of stylized representations are compiled into a file for incorporation into a writing program associated with the processor operable device 20. Additional features include successively entering, into the designated fields, each figure or character represented on the keyboard.

A computer writeable medium is also disclosed for creating a personalized digital font for incorporation into a software based writing program, and which includes a first protocol for communicating the writing program, contained within a processor operable device, with a separately communicable electronic input device exhibiting a display face. A second protocol, responsive to a character selection from a keyboard associated with the processor operable device, displays the selected character on a field associated with the display face of the electronic input device.

A third protocol displays a corresponding field upon the display face of the electronic input device, within which is subsequently engaged a marking stylus to create a personalized representation of the selected character. Finally, a fourth protocol compiles a completed collection of stylized representations into a file for incorporation into a writing program associated with the processor operable device.

Having described my invention, other and additional preferred embodiments will become apparent to those skilled in the art to which it pertains, and without deviating from the scope of the appended claims:

We claim:

1. A system for creating a personalized font, comprising:
   a processor operable device incorporating a keyboard and a screen display;
   a secondary device for inputting characters on said screen display of said processor operable device, said secondary device further including an electronic pad exhibiting a display, a stylus pen operatively communicating with said pad and being manipulated to mark upon at least one field exhibited by said pad on its display, said electronic pad further including a digital input device including a software component interfaceable with separate processor operable device; and
   said secondary device being utilized in combination with the keyboard in order to create a personalized font associated with a software writing program of the processor operable device.

2. The system as described in claim 1, the processor operable device further comprising at least one of a laptop computer, desktop computer, cellular telephone, or a personal digital assistant.

3. The system as described in claim 1, further comprising a USB cable extending from said pad to said processor operable device.

4. The system as described in claim 1, further comprising a wireless connection established between said pad and said processor operable device.

5. The system as described in claim 1, further comprising a software component downloaded by said processor operable device.

6. The system as described in claim 5, said software component further comprising at least one of an insertable disc or a downloadable file.

7. A method for the creation of a stylized font, comprising the steps of:
   communicating an electronic pad to an input location of a separate processor operable device including a keyboard;
   initiating a protocol between said pad and processor operable device in order to progressively program a stylized font, said protocol including selecting individual characters, via the keyboard, for display upon a field of said electronic pad;
   employing a stylus to input, by marking, into a series of separate fields of said electronic pad, a personalized duplication/representation of the selected characters;
   successively entering, into the separate fields, each figure or character represented on the keyboard; and
   compiling a completed collection of stylized representations into a file for incorporation into a writing program associated with the processor operable device.

8. A non-transitory computer writeable medium for creating a personalized digital font for incorporation into a software based writing program, comprising:
   a first protocol for communicating the writing program, contained within a processor operable device, with a separately communicable electronic input device exhibiting a display face;
   a second protocol, responsive to a character selection from a keyboard associated with the processor operable device, to display the selected character on a field associated with the display face of the electronic input device;

a third protocol for displaying a corresponding field upon the display face of the electronic input device, upon which is subsequently engaged a marking stylus to create a personalized representation of the selected character;

a fourth protocol for outputting the personalized representation from the electronic input device to the communicating processor operable device and for compiling a completed collection of stylized representations into a file for incorporation into a writing program associated with the processor operable device;

a fifth protocol for selecting, from the writing program associated with the processor operable device, a previously created font compiled within a previously compiled file and for typing using the personalized font.

* * * * *